W. T. WILSON.
CLOTH BOARD WITH CUSHIONING EDGES.
APPLICATION FILED AUG. 18, 1913.
1,138,434.
Patented May 4, 1915.
3 SHEETS—SHEET 1.
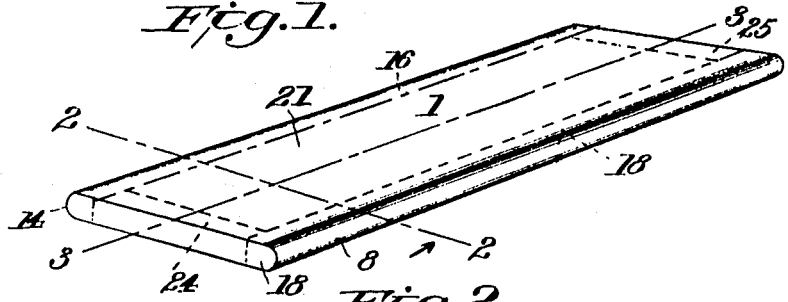
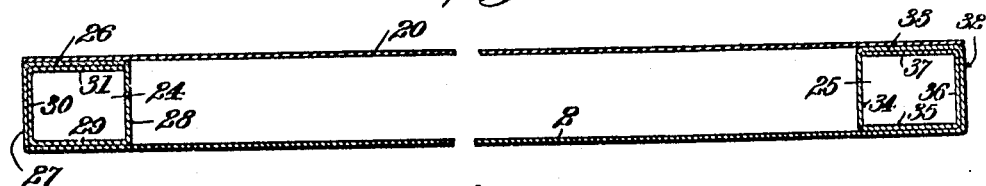
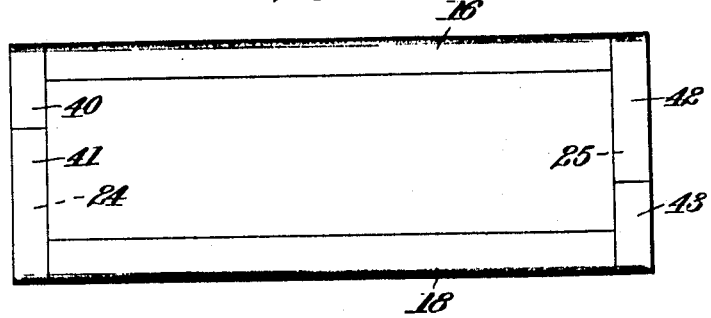

W. T. WILSON.
CLOTH BOARD WITH CUSHIONING EDGES.
APPLICATION FILED AUG. 18, 1913.
1,138,434.
Patented May 4, 1915.
3 SHEETS—SHEET 2.
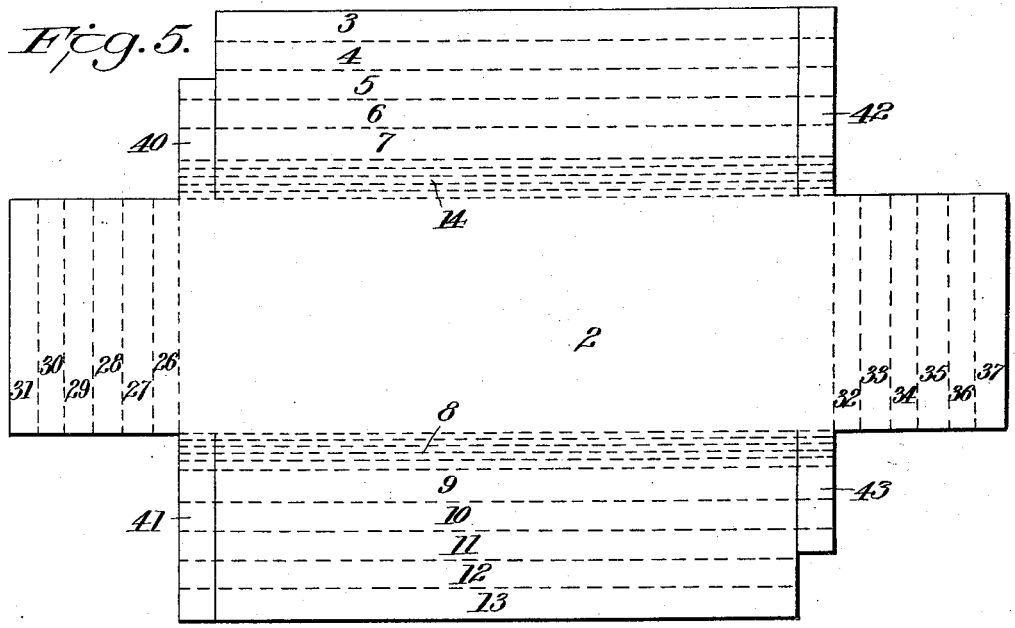
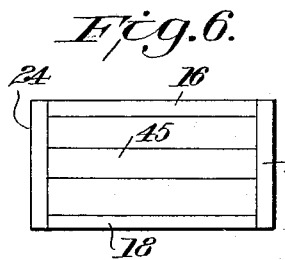 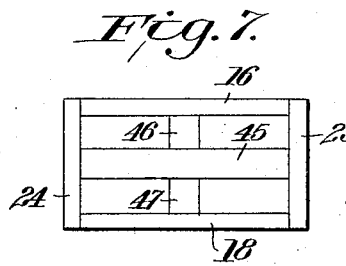 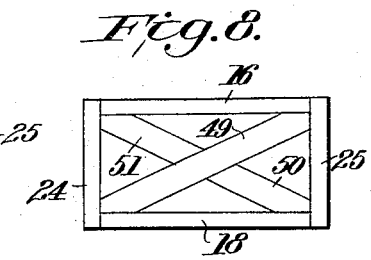
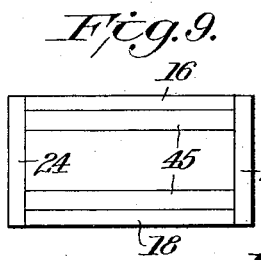 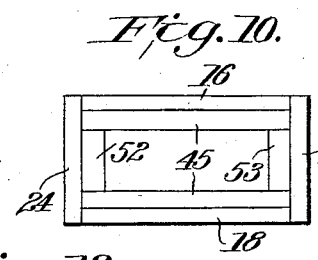 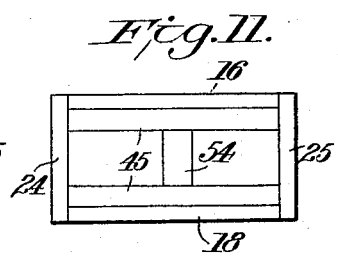
Witnesses
C. N. Walker.
Byron B. Collings.
Inventor
W. T. Wilson by
Attorney W. T. WILSON.
CLOTH BOARD WITH CUSHIONING EDGES.
APPLICATION FILED AUG. 18, 1913.
1,138,434.
Patented May 4, 1915.
3 SHEETS—SHEET 3.
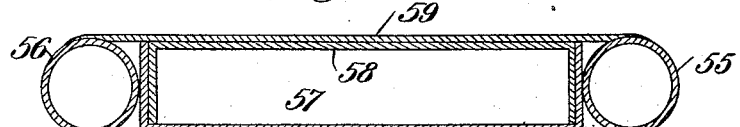
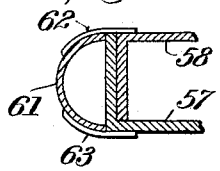 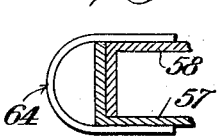 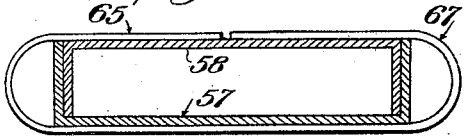
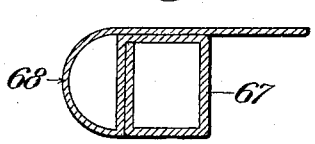 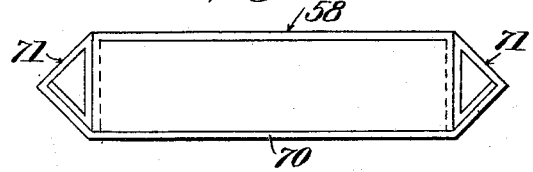
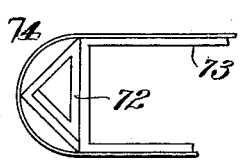 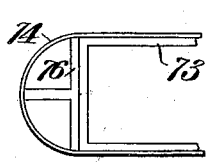 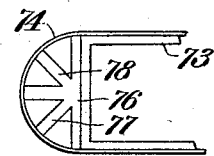
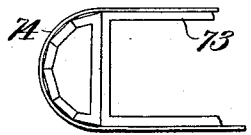 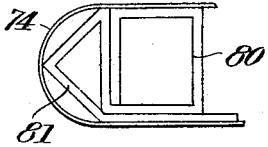

UNITED STATES PATENT OFFICE.

WYLE T. WILSON, OF PHILADELPHIA, PENNSYLVANIA.

CLOTH-BOARD WITH CUSHIONING EDGES.

1,138,434.  Specification of Letters Patent.  Patented May 4, 1915.

Application filed August 18, 1913. Serial No. 785,331.

*To all whom it may concern:*

Be it known that I, WYLE T. WILSON, a citizen of the United States, residing at Philadelphia, in the county of Philadelphia and State of Pennsylvania, have invented certain new and useful Improvements in Cloth-Boards with Cushioning Edges; and I do hereby declare the following to be a full, clear, and exact description of the invention, such as will enable others skilled in the art to which it appertains to make and use the same.

This invention relates to cloth boards preferably made of paper, especially adapted for shipping and handling cloth, or other material wrapped on the same, and has for its object to provide a comparatively inexpensive construction which will be more efficient in use than those heretofore proposed.

To those ends the invention consists in the novel details of construction and combinations of parts more fully hereinafter disclosed and particularly pointed out in the claims.

Referring to the accompanying drawings forming a part of this specification in which like numerals designate like parts in all the views:—Figure 1 is a perspective view of a completed board made in accordance with my invention; Fig. 2 is a transverse sectional view of the same taken on the line 2—2 of Fig. 1; Fig. 3 is a longitudinal sectional view taken on the line 3—3 of Fig. 1; Fig. 4 is a plan view of the body of the board with cover plate and outer covering removed; Fig. 5 is a plan view of a blank out of which the body shown in Fig. 4 is made; Figs. 6, 7, 8, 9, 10 and 11 are detail plan views showing different board bodies provided with stiffening or bracing members; Fig. 12 is a sectional view of one form of stiffening member, suitable for Figs. 6 to 11; Fig. 13 is a sectional view of a modified form of construction; Figs. 14, 15 and 16 are diagrammatic sectional views of still further modified forms of my invention; Figs. 17, 18 and 19 are detail diagrammatic views of still further modified forms of construction; and Figs. 20, 21, 22 and 23 are like views of other modified forms of my invention.

1 indicates a board on which silk, cloth, etc., may be wound, made from the paper blank 2, Fig. 5, whose side flap 3 is bent to form the wall 4, bent again to form the wall 5, bent again to form the wall 6, and again to form the wall 7 overlying the flap 3 or wall of the rectangular hollow prism 16, Fig. 2, which being thus formed, runs along the edge of the board 1, and serves to give it thickness, rigidity and strength. The paper blank 2 is provided on its other edge with the flaps 8, 9, 10, 11, 12 and 13 which are similarly folded to form a second curved edge and the walls of a second prism 18 in all respects the same as the prism 16, as will be readily understood from Figs. 2 and 5. The blank 2 is further provided with end flaps numbered from 26 to 31 and from 32 to 37 respectively which are folded as indicated in Fig. 3 to form the end prisms 24 and 25 respectively.

In addition to the side and end flaps just described, the blank 2 is or may be provided with the narrow strip like flaps 40 and 41, which fold down over the end prism 24, and the similar narrow strip like flaps 42 and 43 which fold down over the end prism 25, as will be clear from Fig. 4. The body form thus produced is open at the top as shown, and may be conveniently closed by a sheet 20 Fig. 3, which is glued or otherwise secured to the walls of the prisms as indicated. Over the whole or a part of the closed hollow board thus formed I may now paste the finishing sheet or envelop 21, Fig. 2, to improve its appearance.

In some cases the body of the board needs further stiffening and I provide the same by inserting the bracing member 45 preferably made by folding a strip of paper into a hollow form as indicated in Fig. 12. In Fig. 7, I add the additional hollow members 46 and 47. In Fig. 8, I employ the diagonal hollow member 49 and the additional members 50 and 51. In Fig. 9 two members 45 are employed alongside the prisms 16 and 18 and in Fig. 10 the additional members 52 and 53 are employed alongside the prisms 24 and 25. In Fig. 11 the single additional member 54 is placed between the members 45 as shown.

In the modified form of my invention shown in Fig. 13, I provide two hollow edge members 55 and 56, a box member 57 into which fits a second box member 58, and I secure to said parts by any convenient means the paper sheets 59 and 60 thus completing the cloth board. In Fig. 14, the box members 57 and 58 are or may be the same as in Fig. 13, but there is secured thereto the hollow half cylinder edge member 61 by means of the strips 62 and 63. In Fig. 15 the strip 64 forms the hollow edge of the board and extends over on to the box members. In Fig. 16, the sheet 65 envelops the box members, while in Fig. 17 the blank is rolled up to form the prism 67 and hollow edge 68 as indicated. In Fig. 18 the box member 70 is opened out to receive the hollow triangular prisms 71 between its walls and the box member 58. In Fig. 19 the triangular prism 72 is secured to the box member 73 and the sheet 74 pasted over the whole as indicated. In Fig. 20 the T shaped member 76 is secured to the body 73 and the sheet 74 secured over the whole. In Fig. 21, the additional strips 77 and 78 are added to the parts as shown. In Fig. 22 the D shaped member is secured to the box member, and in Fig. 23 the paper is folded to form the prism 80 and then the triangular prism 81, and the paper 74 pasted over the whole.

As is well known, cloth boards as now generally employed are provided with end and side edges of wood, and it results from this construction that when silk and other goods are wrapped on such boards, any impact by a hard or sharp object catches the fibers of the goods between the said object and the firm wooden edge, so that said fibers are apt to be indented and broken and the goods are injured.

By my invention on the other hand, in all the forms illustrated I provide yielding or soft edges, such for example as those formed by the air spaces 18 and 19, the prisms 24 and 25, etc., or by the other exposed surfaces of the board, which edges or surfaces receive such impacts, so that no matter how, nor where the goods are struck, my board will yield and cushion the blow and thereby protect the goods from injury.

Not only is my board capable of yielding as just described, to protect the goods against injury, but it is also light and strong, and can by employing the braces disclosed be made as stiff as desired.

It is obvious that those skilled in the art may vary the details of construction, the material out of which my board is made, as well as the arrangement of parts, without departing from the spirit of my invention, and therefore, I do not wish to be limited to the above disclosure except as may be required by the claims.

What I claim is:—

1. A cloth board provided with a body portion having top and bottom side walls; cushioning edge walls joining said side walls; and end walls terminating flush with said side walls and joining said edge walls, substantially as described.

2. A cloth board provided with a hollow body portion having top and bottom side walls; hollow cushioning edge walls joining said side walls; and end walls terminating flush with said side walls and joining said edge walls, substantially as described.

3. A cloth board provided with a body portion having top and bottom side walls; cushioning edge walls associated with hollow chambers joining said side walls; and end walls terminating flush with said side walls and joining said edge walls, substantially as described.

4. A cloth board comprising a hollow body portion; stiffening means associated with said body portion; side walls associated with said body portion; cushioning edge walls terminating in said side walls; and end walls terminating in said side and edge walls, substantially as described.

5. A cloth board comprising a hollow body portion; stiffening means comprising hollow prisms associated with said body portion; side walls associated with said body portion; cushioning edge walls terminating in said side walls; and end walls terminating in said side and edge walls, substantially as described.

6. A cloth board comprising a hollow body portion; stiffening means comprising hollow prisms and additional stiffeners associated with said body portion; side walls associated with said body portion; cushioning edge walls terminating in said side walls; and end walls terminating in said side and edge walls, substantially as described.

7. A hollow cloth board body made from a single blank and provided with hollow stiffening members, hollow cushioning edges, and end walls terminating flush with said body, substantially as described.

8. A hollow cloth board body made from a single blank and provided with hollow stiffening members, hollow cushioning edges, end walls terminating flush with said body; and additional stiffening material, associated with said body, substantially as described.

9. A hollow cloth board body provided with hollow cushioning edges and end walls terminating flush with said body, substantially as described.

10. In a cloth board the combination of a hollow body; end walls terminating flush with said body; hollow cushioning edges; and means for securing said edges to said body, substantially as described.

11. A blank for making hollow cloth board bodies provided on one side with a plurality of side flaps adapted to be folded up into a stiffening prism and an integral cushioning edge; and having on one end a plurality of end flaps adapted to be folded into a hollow stiffening end prism, substantially as described.

12. A blank for making hollow cloth board bodies provided on each side with a plurality of side flaps adapted to be folded into a hollow stiffening prism and a hollow cushioning edge; and provided on each end with a plurality of end flaps adapted to be folded into a hollow prism, substantially as described.

In testimony whereof I affix my signature, in presence of two witnesses.

WYLE T. WILSON.

Witnesses:
B. BRYAN,
JOHN G. SACHS.

Copies of this patent may be obtained for five cents each, by addressing the "Commissioner of Patents, Washington, D. C."